(12) United States Patent
Takano

(10) Patent No.: US 7,162,141 B1
(45) Date of Patent: Jan. 9, 2007

(54) ELECTRO-CONDUCTIVE ANTI-REFLECTION COATING

(75) Inventor: Kazuaki Takano, Santa Rosa, CA (US)

(73) Assignee: JDS Unipahse Corporation, Milpitas, CA (US)

( * ) Notice: Subject to any disclaimer, the term of this patent is extended or adjusted under 35 U.S.C. 154(b) by 0 days.

(21) Appl. No.: 11/252,372

(22) Filed: Oct. 18, 2005

(51) Int. Cl.
*G02B 6/00* (2006.01)
*G02B 1/10* (2006.01)
G02B 6/34 (2006.01)
G02B 5/02 (2006.01)
G02B 13/20 (2006.01)

(52) U.S. Cl. .................. 385/147; 385/37; 385/901; 359/586; 359/588; 359/589

(58) Field of Classification Search .............. 359/586, 359/588, 589; 385/37, 147
See application file for complete search history.

(56) References Cited

U.S. PATENT DOCUMENTS

| | | | | |
|---|---|---|---|---|
| 2,478,385 A | 8/1949 | Gaiser | | 359/580 |
| 3,185,020 A | 5/1965 | Thelen | | 359/586 |
| 3,432,225 A | 3/1969 | Rock | | 359/588 |
| 3,781,090 A * | 12/1973 | Sumita | | 359/588 |
| 4,422,721 A | 12/1983 | Hahn et al. | | 359/585 |
| 4,960,310 A * | 10/1990 | Cushing | | 359/888 |
| 5,147,125 A * | 9/1992 | Austin | | 359/359 |
| 5,179,468 A * | 1/1993 | Gasloli | | 359/359 |
| 5,337,191 A * | 8/1994 | Austin | | 359/885 |
| 5,362,552 A * | 11/1994 | Austin | | 428/216 |
| 5,667,880 A | 9/1997 | Okaniwa | | 428/212 |
| 5,725,959 A * | 3/1998 | Terada et al. | | 428/448 |
| 6,532,112 B1 | 3/2003 | Chu | | 359/585 |
| 6,586,101 B1 | 7/2003 | Chu | | 428/432 |

\* cited by examiner

*Primary Examiner*—John D. Lee
*Assistant Examiner*—Rhonda S. Peace
(74) *Attorney, Agent, or Firm*—Allen, Dyer, Doppelt, Milbrath & Gilchrist, P.A.

(57) ABSTRACT

The present invention relates to an electro-conductive, anti-reflection coating with the conventional half-wave, high-index layer sandwiched between two quarter-wave, low-index layers, in which the high-index, half-wave layer forms an electro-conductive layer, and in which the layer materials are selected such that an index ratio (high index/low index) is between 1.45 to 1.55 providing wide band widths for the anti-reflection coating. Preferably, the half-wave, electro-conductive, high index layer comprises indium titanium oxide providing a sheet resistance of less than 20 ohms/sq.

26 Claims, 6 Drawing Sheets

US 7,162,141 B1

ELECTRO-CONDUCTIVE ANTI-REFLECTION COATING

CROSS-REFERENCE TO RELATED APPLICATIONS

The present invention does not claim priority.

TECHNICAL FIELD

The present invention relates to a high efficiency, anti-reflection coating (HEA) for displays, and in particular to a electro-conductive, anti-reflection coating with an optimum anti-reflection bandwidth.

BACKGROUND OF THE INVENTION

Simple anti-reflection (AR) coatings, such as those disclosed in U.S. Pat. No. 2,478,385 issued Aug. 9, 1949 to Gaiser, and U.S. Pat. No. 3,185,020 issued May 25, 1965 to Thelen, include a three layer structure mounted on a substrate in which a high index layer, which has an optical thickness of a half of the center wavelength of a given bandwidth of light, is sandwiched between two lower index layers, which each have an optical thickness of one quarter of the center wavelength. The inner ¼ wavelength layer index matches the substrate to the center ½ wavelength layer, while the outer ¼ wavelength layer index matches the center ½ wavelength layer to the air. The aforementioned structure is known as the QHQ structure.

Improvements to the basic QHQ structure have been developed to improve performance, such as the one disclosed in U.S. Pat. No. 3,432,225 issued Mar. 11, 1969 to Rock, in which the inner low index, ¼-wavelength layer is replaced by a simulated ¼ wavelength layer comprising one high-index layer, which has an optical thickness of one eight the center wavelength, and one low-index layer, which also has an optical thickness of one eight the center wavelength.

More recent developments include the addition of a transparent electro-conductive layer to the basic QHQ structure for a variety of reasons, e.g. to provide electromagnetic interference (EMI) shielding, and for thin film heater applications. Conventionally, as disclosed in U.S. Pat. No. 4,422,721 issued Dec. 27, 1983 to Hahn et al, U.S. Pat. No. 5,667,880 issued Sep. 16, 1997 to Okaniwa, U.S. Pat. No. 6,532,112 issued Mar. 11, 2003 to Chu, and U.S. Pat. No. 6,586,101 issued Jul. 1, 2003 to Chu, the transparent electro-conductive layer is formed from indium tin oxide (ITO) and is positioned outside the QHQ structure, i.e. next to the substrate or on the outer layer. Unfortunately, the reflectance performance of an ITO-based electro-conductive AR coating is not as good as the conventional non-conductive AR coating, as illustrated in FIG. 1, in particular near the lower and upper ends of the visible bandwidth, i.e. 440 mm and 675 nm, respectively, because the index of refraction of the ITO is too low, e.g. <2, resulting in a high index to low index ratio of <1.45.

Indices of ITO are a function of the coating rate or the oxidation level of the film, i.e. the slower the rate becomes the higher the indices throughout the visible range of the spectrum. If the coating rate is slowed down enough, ITO will start transmitting well beyond 1,000 nm, but the resistivity will increase rapidly as the oxidation level increases. Accordingly, an effective EMI shielding AR coating cannot be build providing a sheet resistance of less than 20 ohms/sq with ITO films.

Accordingly, conventional ITO-based HEA coatings can not be used for avionics instruments, e.g. for display cover glass, which are typically required to meet the MIL-C-14806A 1974 amendment that requires the maximum reflectance at 440 nm and 657 nm to be 0.55%, and the bandwidth ratio at 0.55% R to be at least 1.534.

An object of the present invention is to overcome the shortcomings of the prior art by providing an electro-conductive AR coating that incorporates a transparent electro-conductive layer with a refractive index >2 into the QHQ structure resulting in a high index to low index ratio of between 1.45 and 1.55 with a sheet resistance of less than 20 ohms/sq.

SUMMARY OF THE INVENTION

Accordingly, the present invention relates to an electro-conductive, anti-reflection coating providing an anti-reflection effect for light having a central wavelength comprising:

a first ¼-wavelength stack, having an optical thickness of substantially one quarter of the central wavelength, comprising a first low-index layer having a refractive index;

a ½-wavelength stack, having an optical thickness of substantially one half of the central wavelength, comprising a first high-index layer, which is transparent and electrically conductive, and has a refractive index;

a second ¼-wavelength stack, having an optical thickness of substantially one quarter of the central wavelength, comprising a second low-index layer, having a refractive index;

wherein a ratio of the refractive index of the first high-index layer divided by the refractive index of the first low-index layer is between 1.45 and 1.55.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
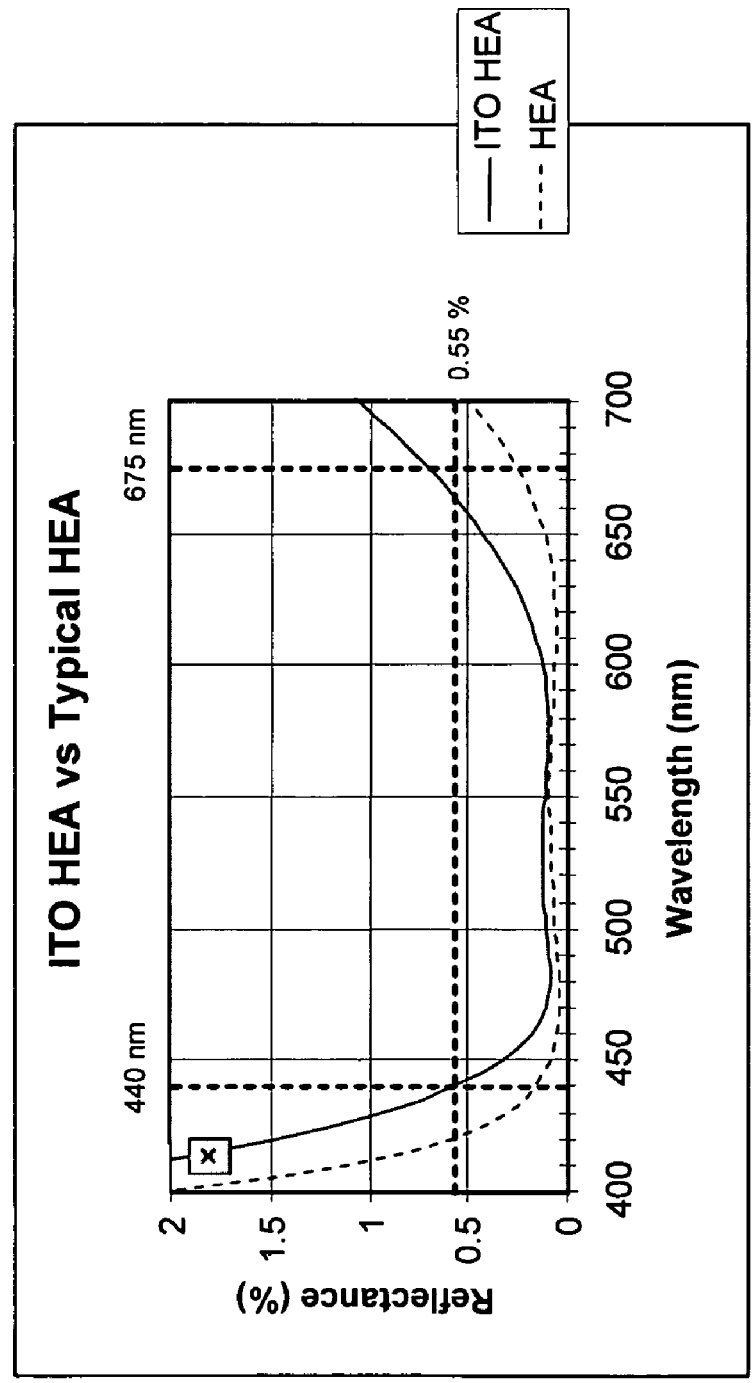
FIG. 1 is a plot of reflectance vs wavelength for a standard non-conductive high efficiency anti-reflection coating (HEA) and a conductive indium tin oxide-based HEA.
Figure 2:
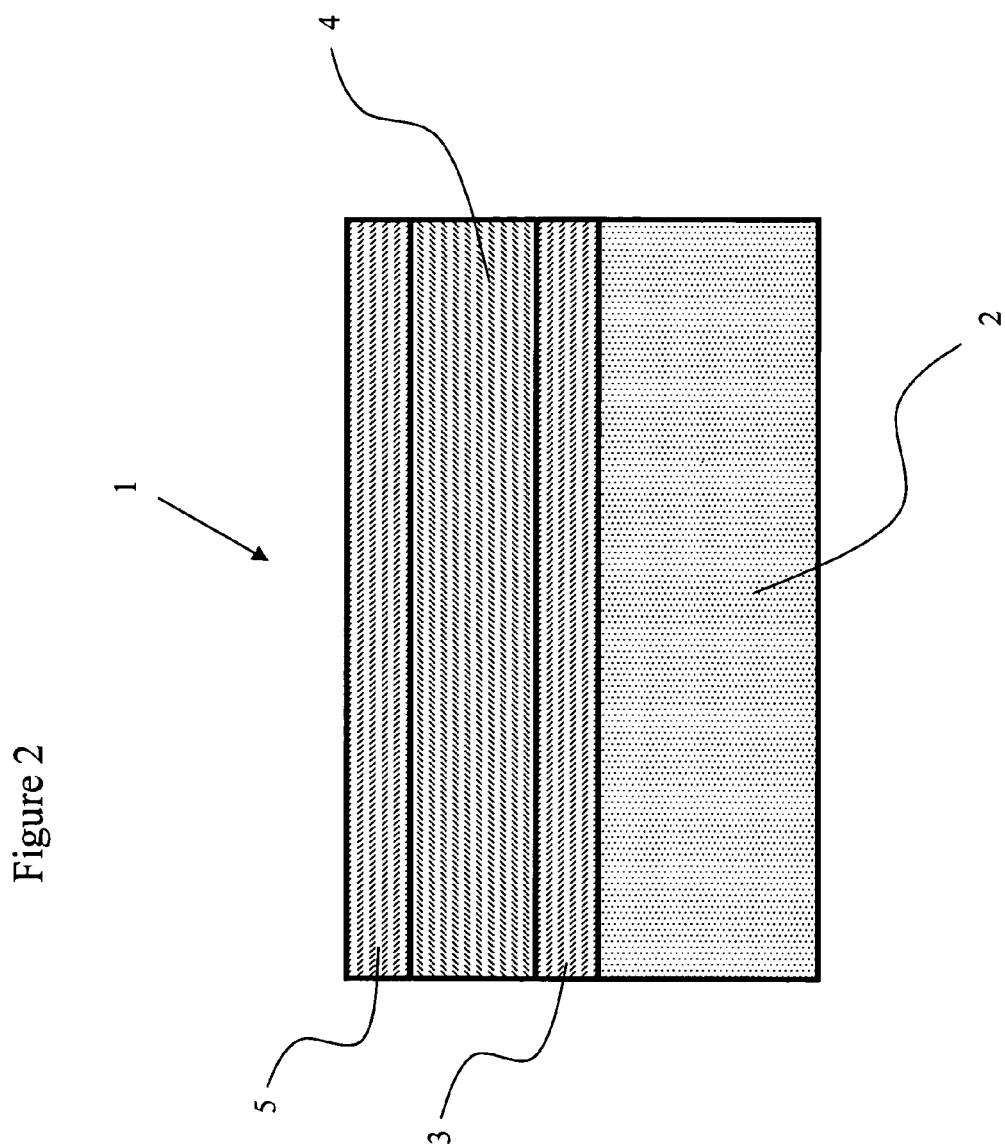
FIG. 2 is a cross-sectional view of a conductive HEA according to the present invention.

With reference to FIG. 2, a electro-conductive, anti-reflection coating structure 1 according to the present invention includes a substrate 2, a first low-index ¼-wave layer 3 adjacent the substrate 2, a high-index ½-wavelength layer 4 having a refractive index greater than the first low-index layer 3, and a second low-index ¼-wave layer 5 having a refractive index lower than the high-index layer 4 and preferably the same as the first low-index layer 3. The second low-index layer 5 is the outermost layer and external to the high-index layer 4, thereby protecting the high-index layer 4 from external damage or exposure. The coating structure, according to the present invention, is designed for the visible spectrum, i.e. 440 nm to 675 nm, whereby the center wavelength is approximately 550 nm. The substrate 2, which may be removed if necessary, has an index of refraction of between 1.4 and 1.7, but preferably between 1.45 and 1.55. Boro float glass (n=1.47) and soda lime float glass (n=1.52) make ideal substrates.

The ½-wave layer 4, which also forms an electro-conductive layer, is preferably formed from a material with an index of refraction of greater than 2.05, more preferably between 2 and 2.15, even more preferably between 2.05 and 2.15, and most preferably between 2.05 and 2.1, thereby providing a high index middle layer for the QHQ structure and a transparent electro-conductive layer. The ideal high-index, electro-conductive material is indium titanium oxide (ITiO) with a refractive index of 2.07. Indices of ITO are a function of the coating rate or the oxidation level of the film, i.e. the slower the rate becomes the higher the indices throughout the visible range of the spectrum. If you slow down enough, ITO will start transmitting well beyond 1,000 nm, but the resistivity will increase rapidly as the oxidation level increases. Accordingly, an effective EMI shielding AR coating cannot be build providing a sheet resistance of less than 20 ohms/sq with ITO films.

Preferably, the first and second low-index ¼-wave layers 3 and 5 are formed from similar or different materials each having a refractive index of less than 1.4, more preferably between 1.33 and 1.43, and most preferably between 1.36 and 1.40 to ensure that the ratio of the index of refraction of the high index material to the index of refraction of the low index material, i.e. the index ratio, is between 1.45 and 1.55, which results in an effective AR effect, i.e. less than 0.55% reflectance, for a wavelength range as wide as possible. As the index ratio increases or decreases, the wavelength range having an effective AR effect, i.e. less than 0.55% reflectance, decreases. The ideal low index material is magnesium fluoride ($MgF_2$) with a refractive index of 1.38.

Figure 3:
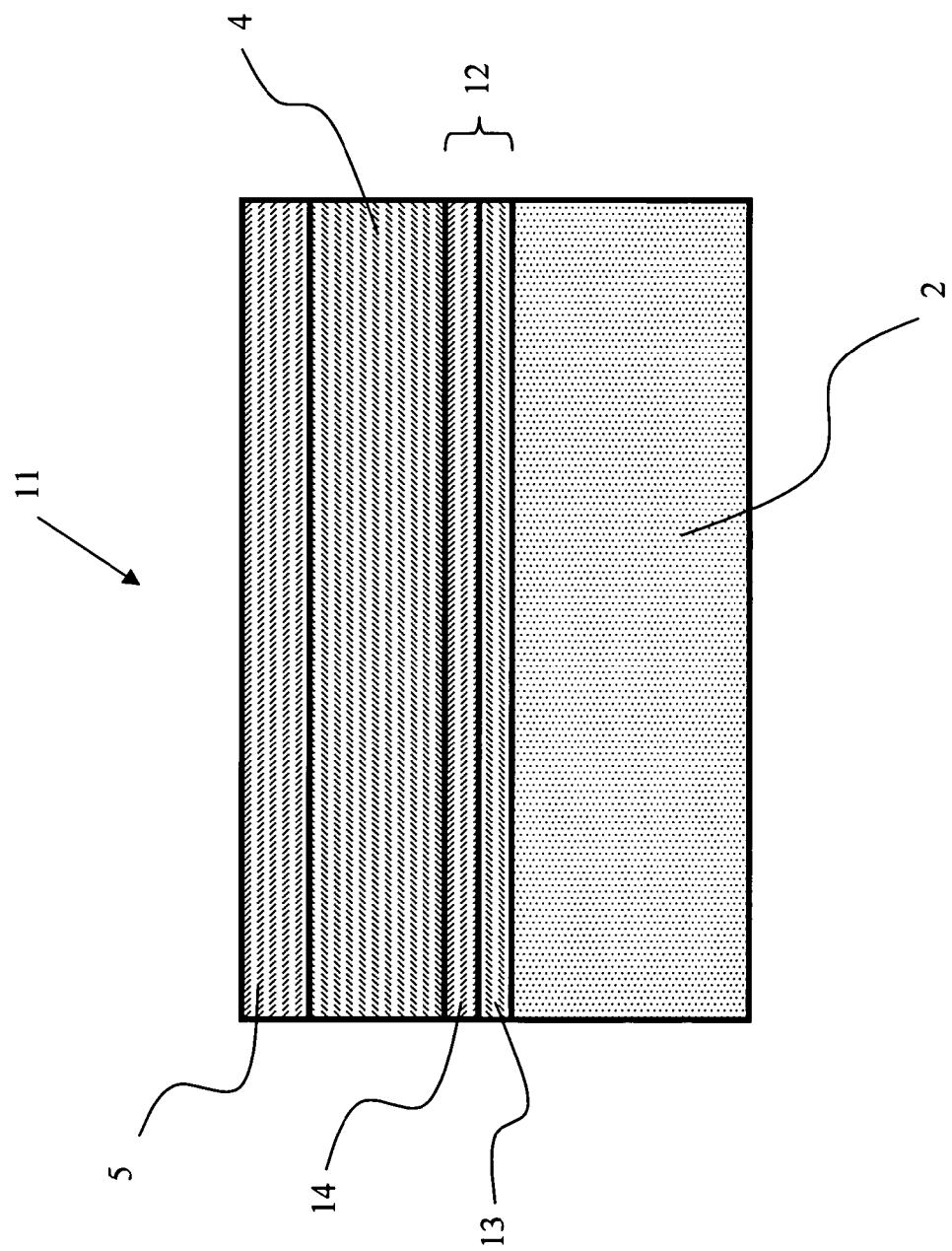
FIG. 3 is a cross-sectional view of a alternative embodiment of a conductive HEA according to the present invention.

FIG. 3 illustrates a second embodiment of the present invention in which an electro-conductive HEA 11 includes the substrate 2, a simulated low-index ¼-wave layer stack 12, the high-index ½-wavelength layer 4 (e.g. 135 nm thick), and the second low-index ¼-wave layer 5 (e.g. 90 nm thick). The simulated low-index ¼-wave layer stack 12 is comprised of a high-index, substantially ⅛-wave layer 13 (e.g. 15 nm thick) and a low index, substantially ⅛-wave layer 14 (e.g. 30 nm thick), whereby the high index layers 4 and 13 alternate with the low index layers 5 and 14. The high-index ⅛-wave layer 13 is comprised of a similar transparent electro-conductive material to the ½-wavelength layer 4, and preferably the same material, e.g. ITiO. Similarly, the low-index ⅛-wave layer 14 is comprised of a similar material to the second low-index ¼-wave layer 5, and preferably the same material, e.g. $MgF_2$. The simulated low-index ¼-wave layer 12 provides increased reflective performance, as well as increase conductive performance (e.g. a sheet resistance of <20 ohms/sq) resulting from an extra layer of electro-conductive material integrated into the QHQ structure.

Figure 4:
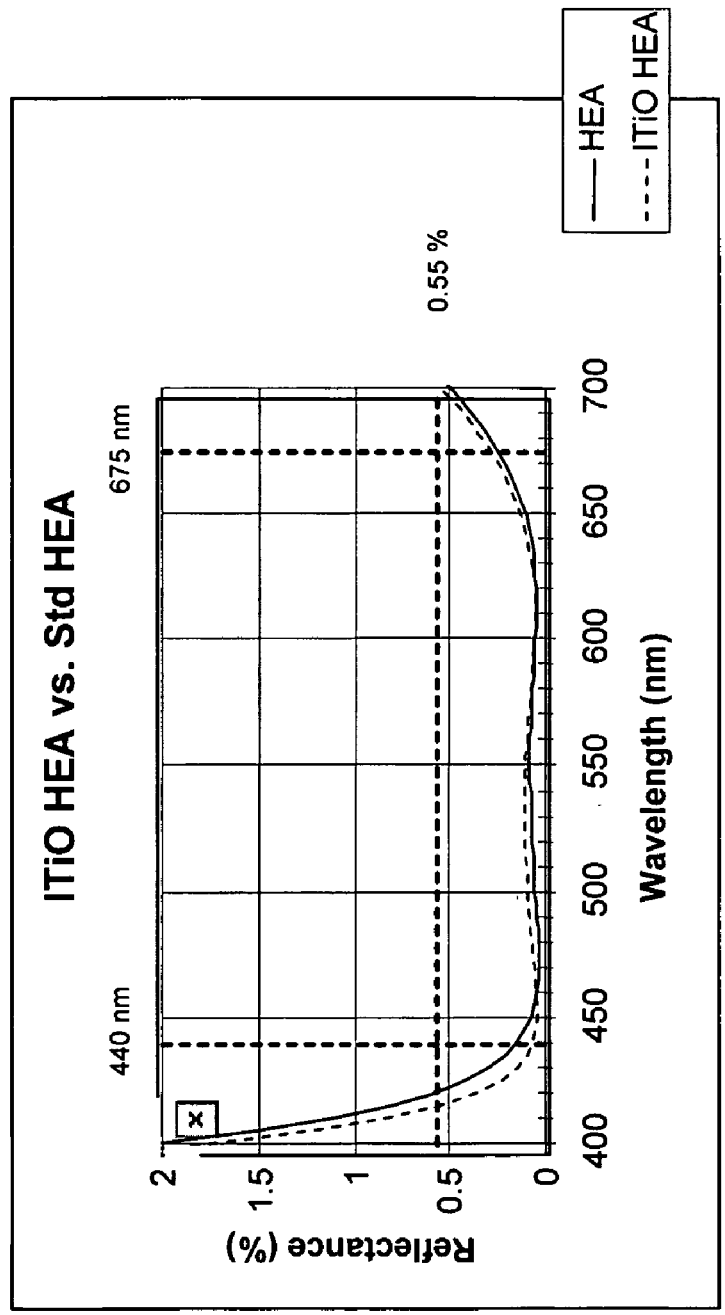
FIG. 4 is a plot of reflectance vs wavelength for a standard non-conductive HEA coating and a conductive indium titanium oxide-based HEA.

The plots in FIG. 4 illustrate the extra bandwidth, i.e. less than 0.55% reflectance, provided by the conductive embodiment of FIG. 3 vs a standard non-conductive HEA. Accordingly, the conductive HEA according to the present invention provides less than 0.55% reflectance between 440 nm and 675 nm.

Figure 5:
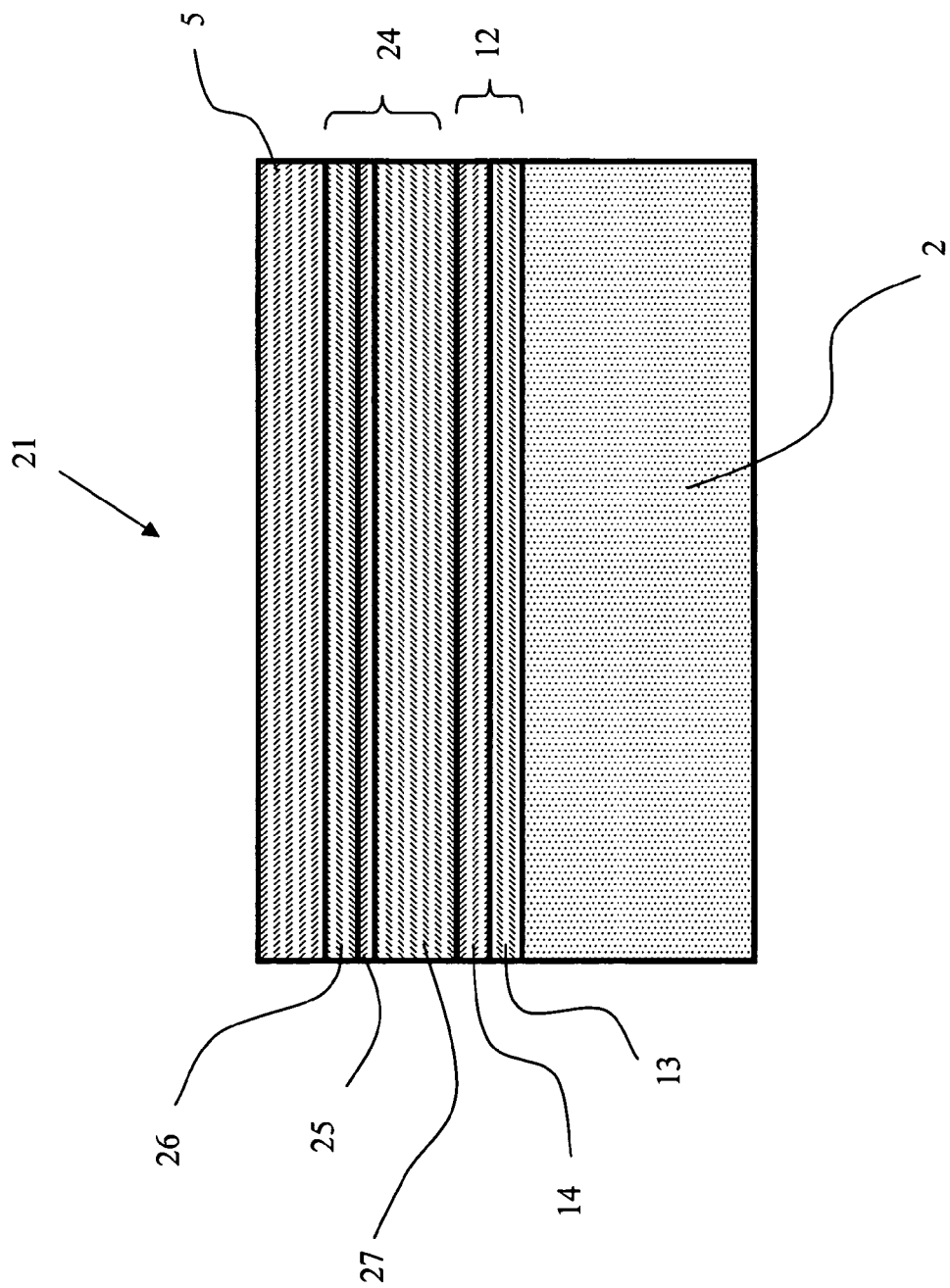
FIG. 5 is a cross-sectional view of an alternative embodiment of a conductive HEA according to the present invention with six layers.

Each of the layers 3, 4 and 5 can be replaced with an equivalent stack of two or more layers of alternating high and low refractive index materials. For example, with reference to FIG. 5, a six layer electro-conductive HEA 21 is illustrated in which the original ½-wavelength layer 4 is replaced by a ½-wavelength layer stack 24 comprised of a low index layer 25, e.g. $MgF_2$ 10 nm thick, sandwiched between first and second high index layers 26 and 27, e.g. ITiO, 40 nm and 90 nm thick, respectively. The second low-index ¼-wave layer 5 remains substantially the same, although the thickness is preferably increased to approximately 100 nm. Similarly, the thicknesses of the high-index ⅛-wave layer 13 (e.g. 20 nm thick) and the low index ⅛-wave layer 14 (e.g. 25 nm thick) are also adjusted. Alternatively, the low index stack 12 can be replaced by the single low-index ¼-wave layer 3. The addition of more layers increases the width of the wavelength range, but also increases the reflectance throughout the band. The sheet or surface resistance of the electro-conductive AR coating 21 remains under 20 ohms/sq. Accordingly, for conductive HEA coatings designed for visible light only, the number of layers is kept to a minimum, while coatings designed for visible and infra-red light are more apt to include the six or eight layer embodiments of FIGS. 5 and 6.

Figure 6:
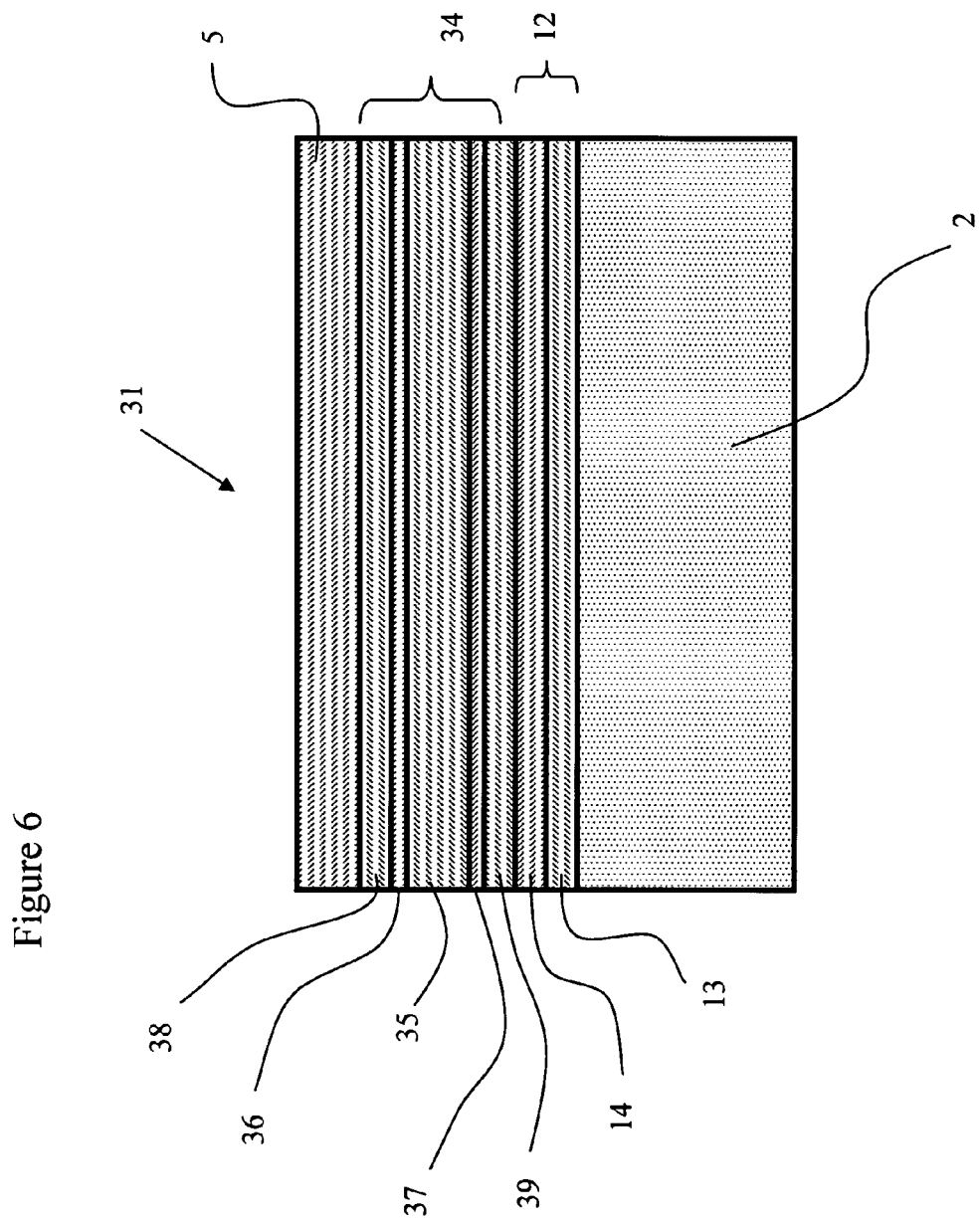
FIG. 6 is a cross-sectional view of an alternative embodiment of a conductive HEA according to the present invention with eight layers.

For an eight-layer conductive HEA coating 31, illustrated in FIG. 6, the original ½-wavelength layer 4 is replaced by a five-layer stack 34 including a central high-index layer 35, e.g. ITiO 105 nm to 110 nm thick, two inner low-index layers 36 and 37, e.g. $MgF_2$ 10 nm to 20 nm thick, and two outer high-index layers 38 and 39, e.g. ITiO 30 nm to 45 nm thick. With the addition of extra conductive material, e.g. ITiO, the sheet resistance of the AR coating 31 can be decreased to below 15 ohms/sq. With the increase in overall thickness, the thickness of the second low index layer 5 preferably increases to approximately 110 nm to 115 nm thick, while the thicknesses of the high-index ⅛-wave layer 13 (e.g. 15 nm to 20 nm thick) and the low-index ⅛-wave layer 14 (e.g. 35 nm to 40 nm thick) are also adjusted. Alternatively, the low-index stack 12 can be replaced by the single low-index ¼-wave layer 3.

I claim:

1. An electro-conductive, anti-reflection coating providing an anti-reflection effect for light having a central wavelength comprising:
    a first ¼-wavelength stack, having an optical thickness of substantially one quarter of the central wavelength, comprising a first low-index layer having a refractive index;
    a ¼-wavelength stack, having an optical thickness of substantially one half of the central wavelength, comprising a first high-index layer, which is transparent and electrically conductive, and has a refractive index;
    a second ½-wavelength stack, having an optical thickness of substantially one quarter of the central wavelength, comprising a second low-index layer, having a refractive index;
    wherein a ratio of the refractive index of the first high-index layer divided by the refractive index of the first low-index layer is between 1.45 and 1.55;
    wherein the first high-index layer comprises indium titanium oxide (ITiO) with a refractive index between 2.0 and 2.15, whereby the coating has a sheet resistance of less than 20 ohm/sq and provides less than 0.55% reflectance between 440 nm and 675 nm; and
    wherein the ½-wavelength stack comprises a third low-index layer sandwiched between the first high-index layer and a third-high index layer.

2. The coating according to claim 1, wherein the first ¼-wavelength stack comprises: the first low-index layer having an optical thickness of substantially ⅛ the central wavelength, and a second high-index layer having an optical thickness of substantially ⅛ the central wavelength.

3. The coating according to claim 2, wherein the second high-index layer is comprised of substantially the same material as the first high-index layer to ensure that the coating has a sheet resistance of less than 20 ohm/sq.

4. The coating according to claim 1, wherein the third high-index layer is comprised of substantially the same material as the first and second high-index layers to ensure that the coating has a sheet resistance of less than 20 ohm/sq.

5. The coating according to claim 1, wherein the refractive index of the first high-index layer is greater than 2.05.

6. The coating according to claim 1, wherein the refractive index of the first high-index layer is between 2.05 and 2.15.

7. The coating according to claim 1, wherein the refractive index of the first high-index layer is between 2.05 and 2.10.

8. The coating according to claim 1, wherein the refractive indexes of the first and second low-index layers are less than 1.40.

9. The coating according to claim 1, wherein the refractive indexes of the first and second low-index layers are between 1.33 and 1.43.

10. The coating according to claim 1, wherein the refractive indexes of the first and second low-index layers are between 1.36 and 1.40.

11. The coating according to claim 1, wherein the first low-index layer is comprised of magnesium fluoride ($MgF_2$).

12. The coating according to claim 1, wherein the ratio is between 1.48 and 1.52.

13. The coating according to claim 1, further comprising a substrate supporting the first ¼-wavelength stack having a refractive index of between 1.45 and 1.55.

14. An electro-conductive, anti-reflection coating providing an anti-reflection effect for light having a central wavelength comprising:
a first ¼-wavelength stack, having an optical thickness of substantially one quarter of the central wavelength, comprising a first low-index layer having a refractive index;
a ½-wavelength stack, having an optical thickness of substantially one half of the central wavelength, comprising a first high-index layer, which is transparent and electrically conductive, and has a refractive index;
a second ¼-wavelength stack, having an optical thickness of substantially one quarter of the central wavelength, comprising a second low-index layer, having a refractive index;
wherein a ratio of the refractive index of the first high-index layer divided by the refractive index of the first low-index layer is between 1.45 and 1.55;
wherein the first high-index layer comprises indium titanium oxide (ITiO) with a refractive index between 2.0 and 2.15,
whereby the coating has a sheet resistance of less than 20 ohm/sq and provides less than 0.55% reflectance between 440 nm and 675 nm;
wherein the first ¼-wavelength stack comprises: the first low-index layer having an optical thickness of substantially ⅛ the central wavelength, and a second high-index layer having an optical thickness of substantially ⅛ the central wavelength; and
wherein the ½-wavelength stack comprises the first high-index layer sandwiched between two inner low-index layers, and two outer high-index materials.

15. The coating according to claim 14, wherein the outer high-index layers are comprised of substantially the same material as the first high-index layer to ensure that the coating has a sheet resistance of less than 20 ohm/sq.

16. An electro-conductive, anti-reflection coating providing an anti-reflection effect for light having a central wavelength comprising:
a first ¼-wavelength stack, having an optical thickness of substantially one quarter of the central wavelength, comprising a first low-index layer having a refractive index;
a ½-wavelength stack, having an optical thickness of substantially one half of the central wavelength, comprising a first high-index layer, which is transparent and electrically conductive, and has a refractive index;
a second ¼-wavelength stack, having an optical thickness of substantially one quarter of the central wavelength, comprising a second low-index layer, having a refractive index;
wherein a ratio of the refractive index of the first high-index layer divided by the refractive index of the first low-index layer is between 1.45 and 1.55;
wherein the ½-wavelength stack comprises a central low-index layer sandwiched between the first high-index layer and a bottom high-index layer.

17. The coating according to claim 16, wherein the bottom high-index layer is comprised of substantially a same material as the bottom high-index layer to ensure the coating has a sheet resistance of less than 20 ohm/sq.

18. The coating according to claim 16, wherein the refractive index of the first high-index layer is between 2.05 and 2.10.

19. The coating according to claim 18, wherein the first high-index layer comprises indium titanium oxide (ITiO).

20. The coating according to claim 19, wherein the refractive indexes of the first and second low-index layers are between 1.36 and 1.40.

21. The coating according to claim 20, wherein the first low-index layer is comprised of magnesium fluoride ($MgF_2$).

22. The coating according to claim 21, wherein the ratio is between 1.48 and 1.52.

23. An electro-conductive, anti-reflection coating providing an anti-reflection effect for light having a central wavelength comprising:
a first ¼-wavelength stack, having an optical thickness of substantially one quarter of the central wavelength, comprising a first low-index layer having a refractive index;
a ½-wavelength stack, having an optical thickness of substantially one half of the central wavelength, comprising a first high-index layer, which is transparent and electrically conductive, and has a refractive index;
a second ¼-wavelength stack, having an optical thickness of substantially one quarter of the central wavelength, comprising a second low-index layer, having a refractive index;
wherein a ratio of the refractive index of the first high-index layer divided by the refractive index of the first low-index layer is between 1.45 and 1.55;

wherein the ½-wavelength stack comprises the first high-index layer sandwiched between two inner low-index layers, and two outer high-index materials.

24. The coating according to claim 23, wherein the two outer high-index layers are comprised of substantially the same material as the first high-index layer to ensure that the coating has a sheet resistance of less than 20 ohm/sq.

25. The coating according to claim 23, wherein the refractive index of the first high-index layer is between 2.0 and 2.15.

26. The coating according to claim 23, wherein the first high-index layer comprises indium titanium oxide (ITiO).

* * * * *

UNITED STATES PATENT AND TRADEMARK OFFICE
CERTIFICATE OF CORRECTION

| | |
|---|---|
| PATENT NO. | : 7,162,141 B1 |
| APPLICATION NO. | : 11/252372 |
| DATED | : January 9, 2007 |
| INVENTOR(S) | : Takano |

It is certified that error appears in the above-identified patent and that said Letters Patent is hereby corrected as shown below:

Col. 4, line 49, "$1/_4$" read -- $1/_2$ --

Col. 4, line 53, "$1/_2$" read -- $1/_4$ --

Signed and Sealed this

Twenty-seventh Day of November, 2007

JON W. DUDAS
*Director of the United States Patent and Trademark Office*